INVENTOR.
Walter Drabik
BY C. R. Meland
HIS ATTORNEY

INVENTOR.
Walter Drabik
BY C. R. Meland
HIS ATTORNEY

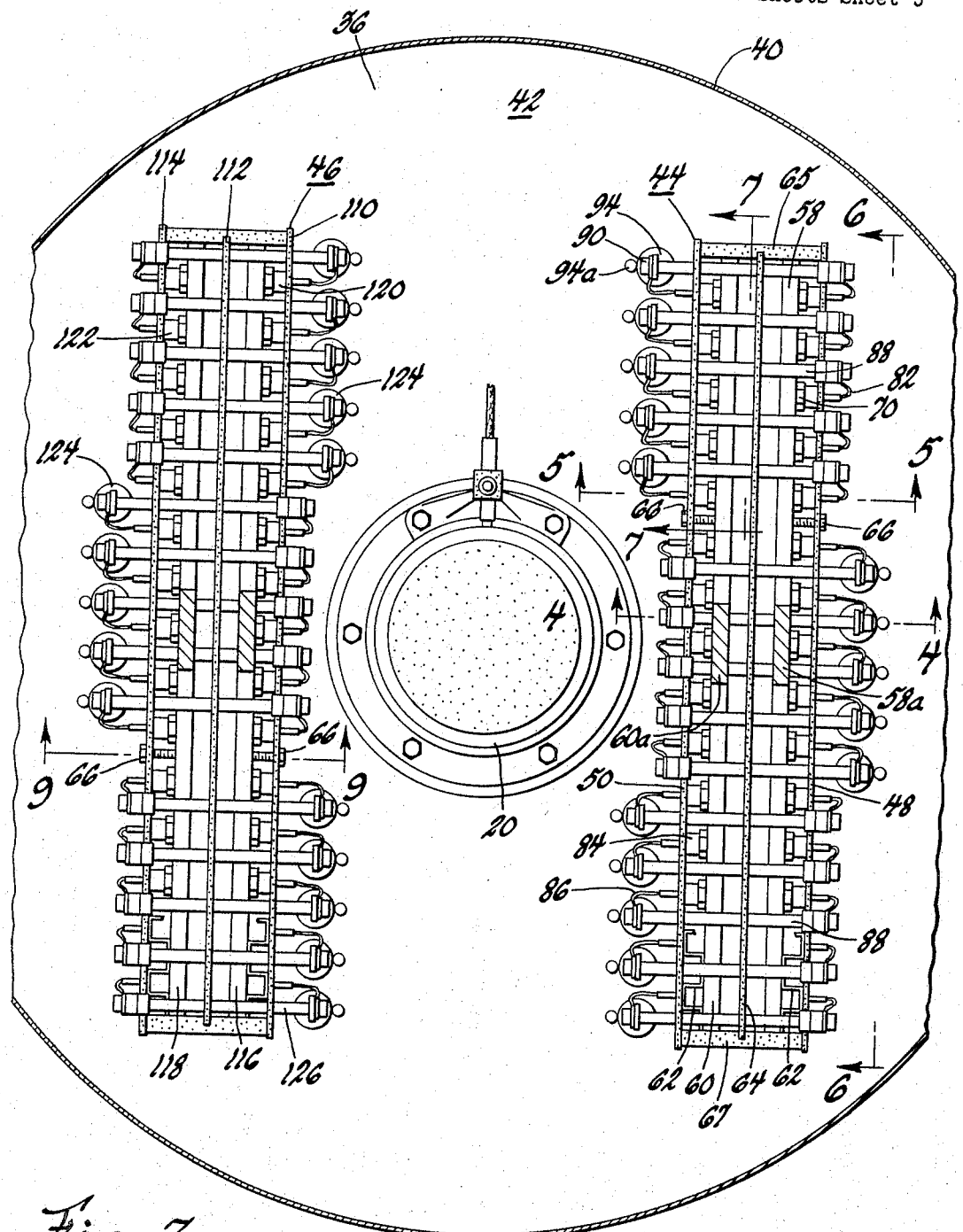

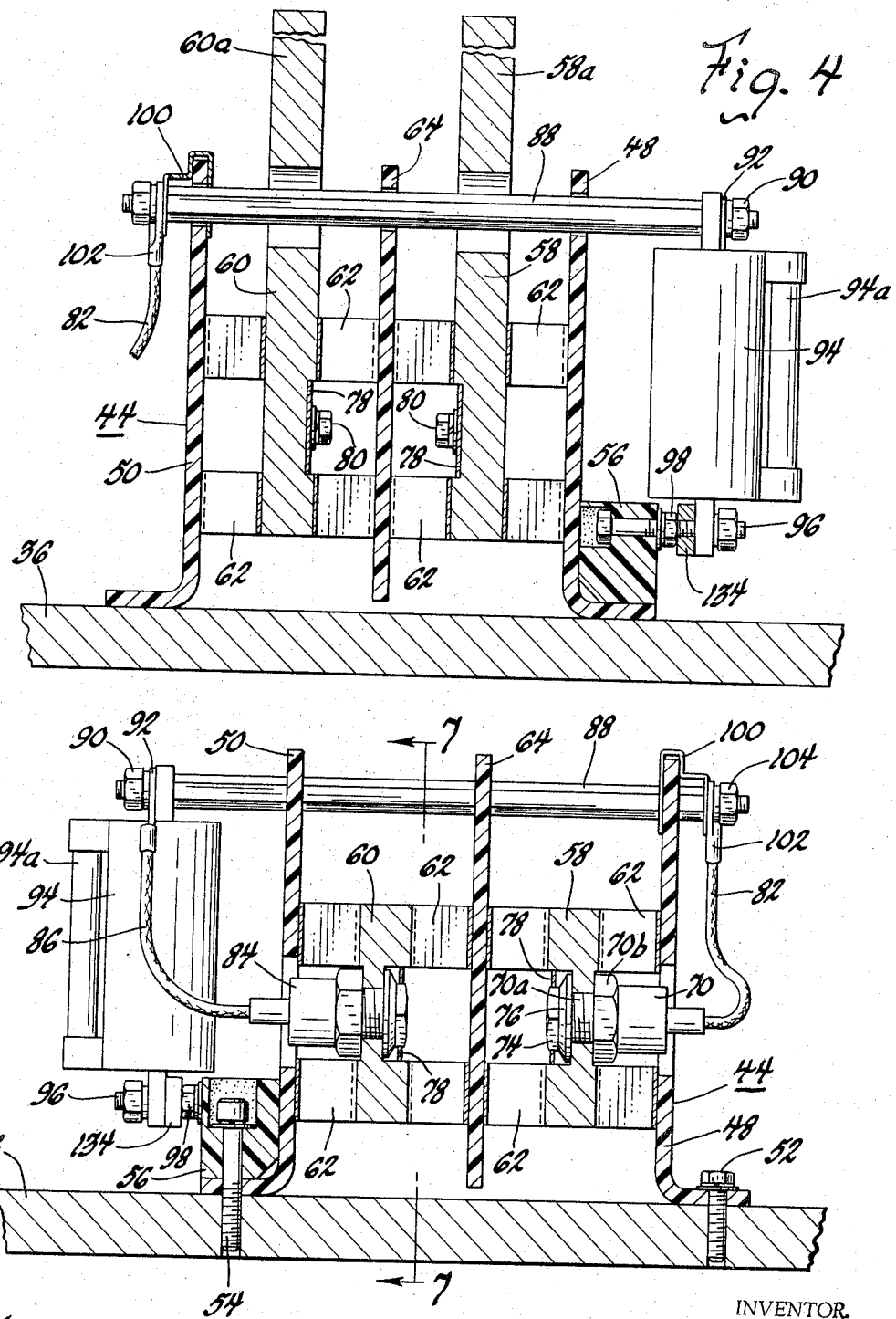

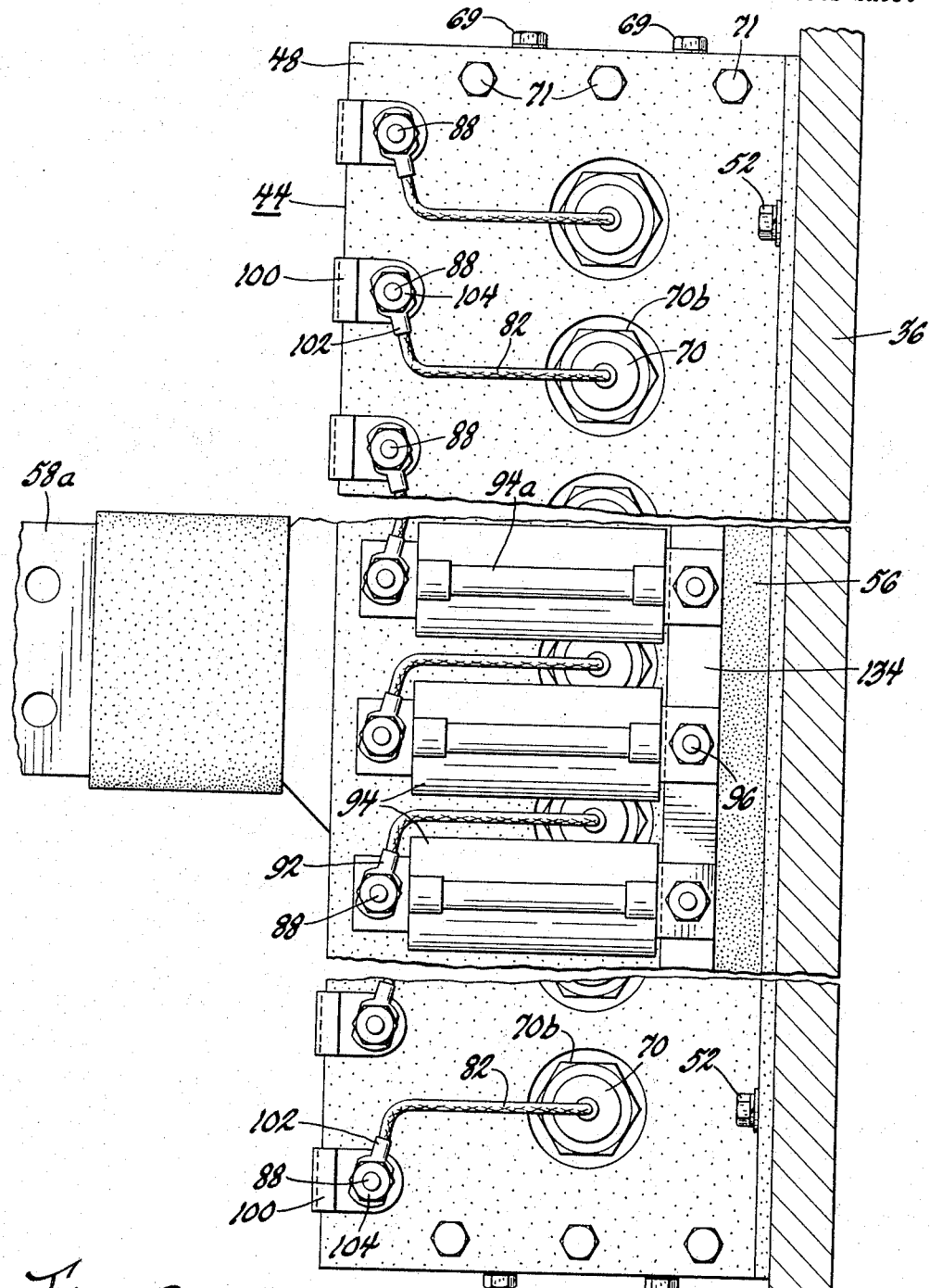

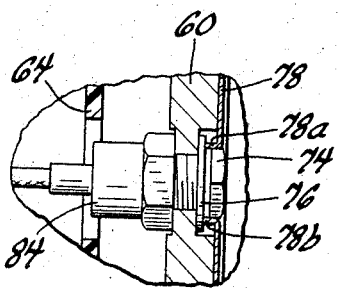
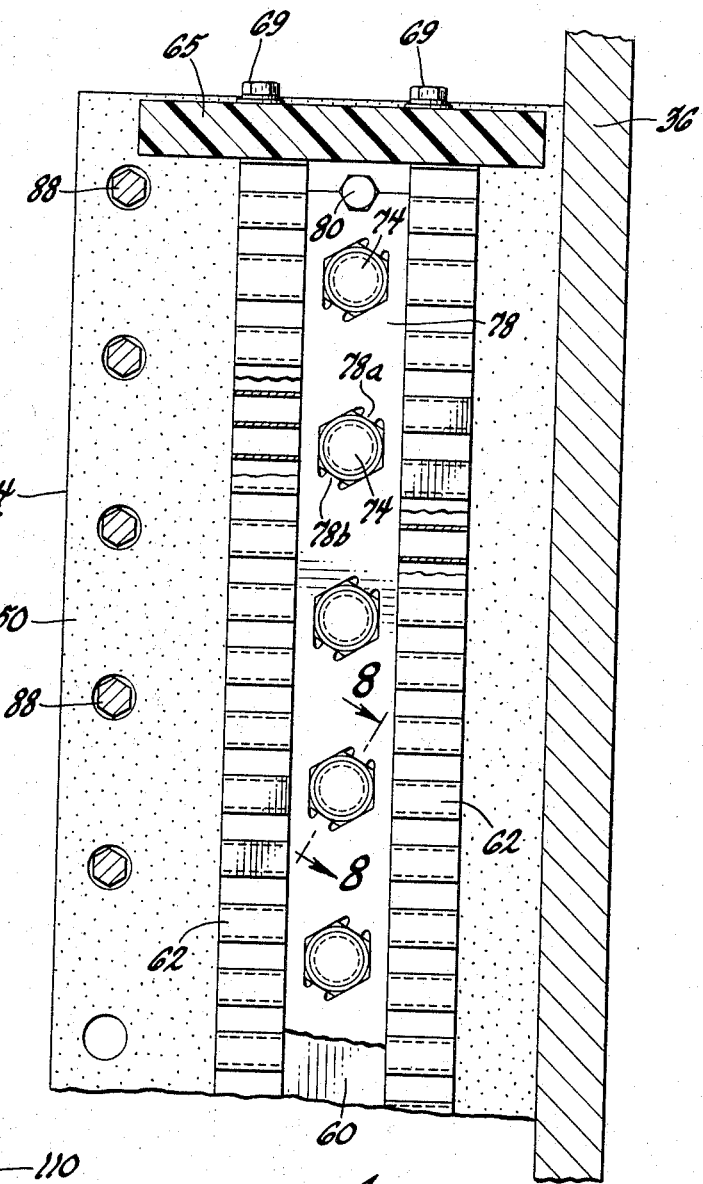
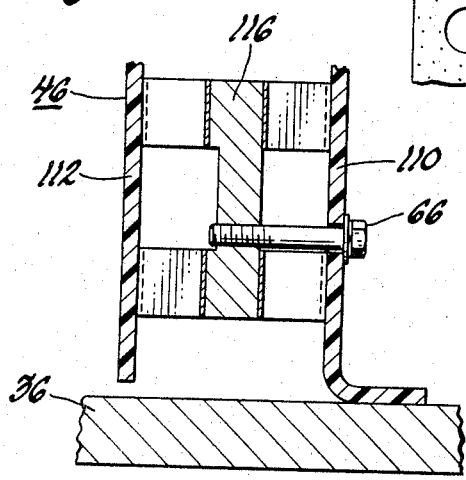

United States Patent Office 3,340,413
Patented Sept. 5, 1967

3,340,413
TRACTION MOTOR POWER SUPPLY UNIT
Walter Drabik, Downers Grove, Ill., assignor to General Motors Corporation, Detroit, Mich., a corporation of Delaware
Filed Nov. 4, 1964, Ser. No. 408,979
9 Claims. (Cl. 310—68)

ABSTRACT OF THE DISCLOSURE

A power supply is provided for supplying current to the traction motors of a locomotive. The power supply comprises an alternating current generator feeding banks of rectifiers located adjacent the end frame of the generator. The rectifiers are mounted on heat sinks which serve as bus bars for supplying current to the traction motors. The heat sinks are supported by insulators and the diodes can be mounted in openings formed in the heat sinks. The diodes have threaded studs which are engaged by nuts and the nuts are restrained from axial and rotatable movement by a retaining device secured to the heat sink.

---

This invention relates to a power supply unit for supplying current to the traction motors of a locomotive and more particularly to a power supply unit that includes an alternating current generator having its output rectified by a power rectifying arrangement.

One of the objects of this invention is to provide a power supply unit for the traction motors of a locomotive which includes an alternating current generator and wherein the power rectifying apparatus for the generator is supported by one of the end frames of the generator and is located within a compartment that is adjacent the end frame.

Another object of this invention is to provide a power rectifier assembly for an alternating current generator which includes two banks of diodes that are mounted on the end frame of the generator.

Still another object of this invention is to provide a power rectifier assembly which includes at least two heat sinks mounted in face to face relationship and insulated from each other by insulators which serve to support the power rectifier assembly.

Still another object of this invention is to provide a power rectifier assembly for powering the traction motors of a locomotive wherein heat sinks are provided that carry a plurality of diodes and wherein these heat sinks serve as direct current bus-bars for the system.

Further objects and advantages of the present invention will be apparent from the following description reference being had to the accompanying drawings wherein preferred embodiments of the present invention are clearly shown.

Figure 1:
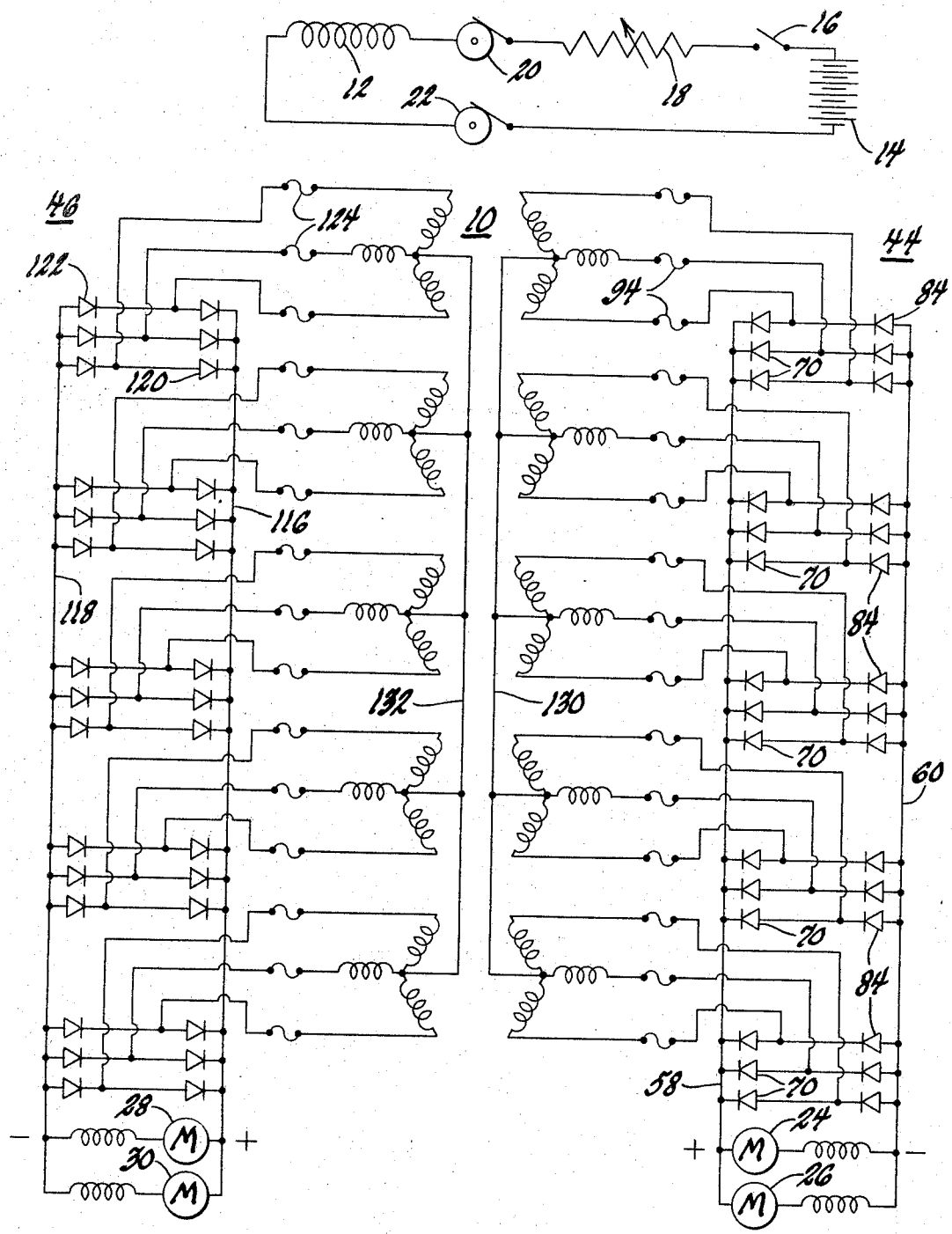
Figure 2:
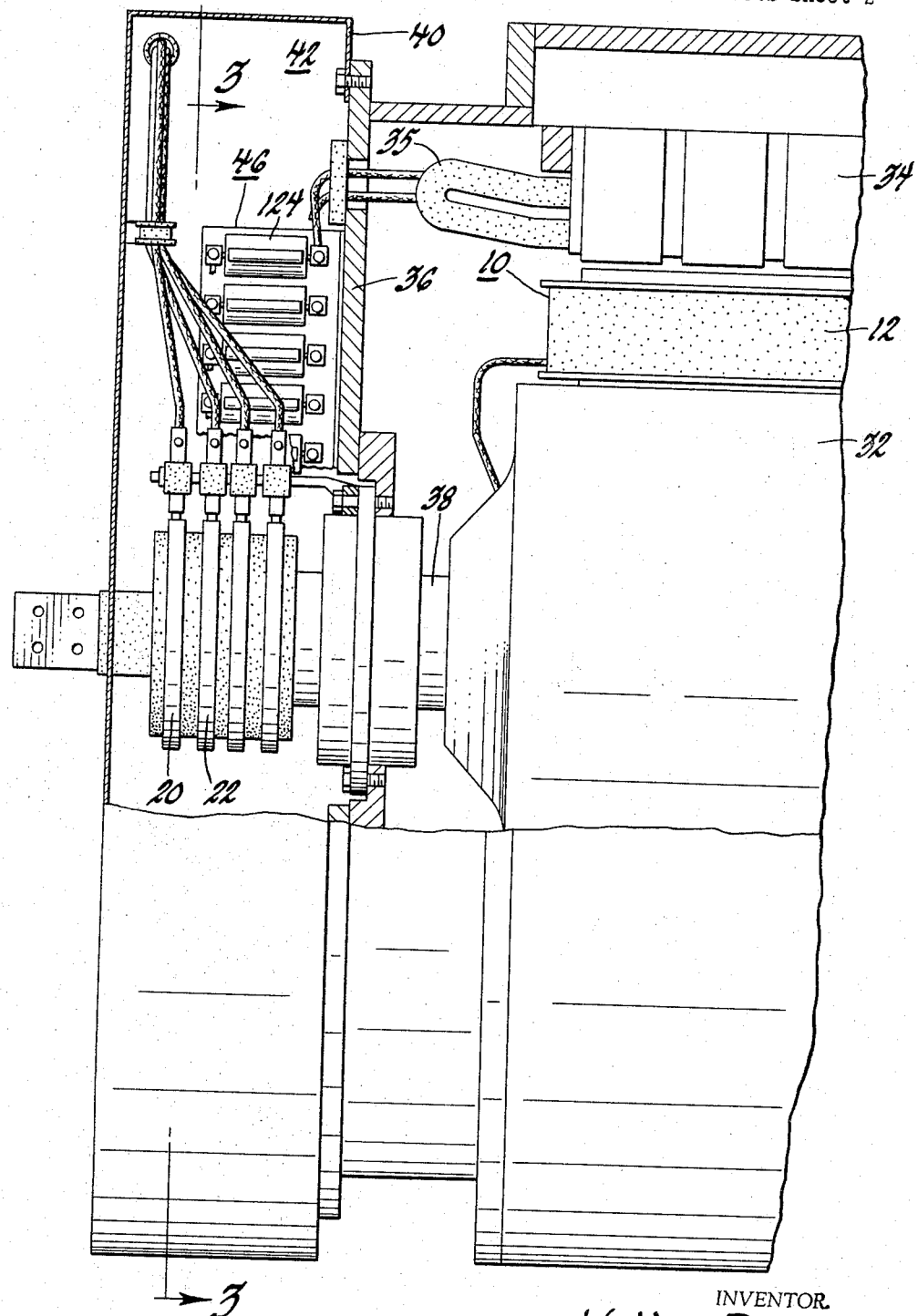

In the drawings:
FIGURE 1 is a schematic circuit diagram of the power rectifying equipment of this invention.
FIGURE 2 is a side view with parts broken away of a diode-rectified traction motor power supply unit made in accordance with this invention.
FIGURE 3 is an end view of the power unit shown in FIGURE 2 illustrating the power rectifying equipment of this invention.
FIGURE 4 is an enlarged sectional view taken along line 4—4 of FIGURE 3.
FIGURE 5 is an enlarged sectional view taken along line 5—5 of FIGURE 3.
FIGURE 6 is a sectional view on an enlarged scale taken along line 6—6 of FIGURE 3.

FIGURE 7 is an enlarged sectional view taken along line 7—7 of FIGURE 3.
FIGURE 8 is a sectional view taken along line 8—8 of FIGURE 7.
FIGURE 9 is a sectional view taken along line 9—9 of FIGURE 3.

Referring now to the drawings and more particularly to FIGURE 1, an electrical system is illustrated for powering the traction motors of a locomotive. The electrical system shown in FIGURE 1 is the subject of patent application Ser. No. 343,737, filed on Feb. 10, 1964, in the name of Elmer E. Thiessen and assigned to the assignee of this invention. The present invention is concerned with the physical arrangement of the system shown in FIGURE 1 and during the description of this invention, the physical arrangement will be described in regard to the FIGURE 1 system. It will be appreciated, however, that the power rectifying structure disclosed and claimed in this application can be used in systems other than that shown in FIGURE 1.

Referring now to FIGURE 1, it can be seen that the system includes an alternating current generator that is generally designated by reference numeral 10. The alternating current generator has ten three phase Y-connected windings and a field winding designated by reference numeral 12. The placement of these windings is to be more fully described hereinafter.

The field winding 12 is energized by a source of direct current 14 through a switch 16, a variable resistor 18 and slip rings 20 and 22.

It is seen that each three phase Y-connected winding of the alternator is connected with a three phase full-wave bridge rectifier network and that the DC output terminals of the bridge rectifier networks are connected together. It is also seen from FIGURE 1 that the DC output terminals of the various bridge rectifier networks feed the series traction motors 24, 26, 28 and 30.

It is intended in the description of this invention to use the same reference numerals on FIGURE 1 as are used to depict the parts of the power unit that supplies the traction motor on a locomotive.

Referring now more particularly to FIGURE 2, the power unit of this invention includes the alternating current generator 10 which has a rotor 32 and a stator 34. The rotor 32 carries the field winding 12 and is of a conventional salient pole type. Field current for the field winding 12 is supplied through conductors connected with the slip rings 20 and 22, the two other slip rings shown in FIGURE 2 being used to supply field current for the field winding of an auxiliary alternating current generator which is not shown in FIGURE 2. The stator 34 is supported by the housing of the machine and is formed of the usual steel laminations having the usual slots which receive the stator winding. As pointed out above, the stator winding is made up of ten three phase Y-connected windings of the type shown in FIGURE 1. The three phase Y-connected windings are located such that the voltage induced in them are in phase.

The power unit of this invention has an end frame 36 which carries one of the bearings for supporting the shaft 38 of the rotor 32. A housing 40 is secured to the end frame 36 and the housing and end frame form a rectifier compartment 42 which houses the diode shown in FIGURE 1 that make up the ten three phase full-wave bridge rectifying networks.

Referring now to FIGURE 3, it is seen that the rectifier compartment 42 contains two banks of rectifiers designated respectively by reference numerals 44 and 46. The rectifier bank 44 includes a pair of insulators 48 and 50 which are best shown in FIGURES 4 and 5. The insulators 48 and 50 are secured to the end frame 36 by a plurality of fasteners or screws 52 and 54. The fasteners 54 also hold insulators 56 in place. The purpose of the insulators 56 will be more fully described hereinafter.

The power rectifier bank 44 includes a pair of heat sinks 58 and 60 which are formed, for example, of aluminum. The heat sinks 58 and 60 carry cooling fins 62 along their entire length. These cooling fins abut the insulators 48 and 50 and also abut a longitudinally extending insulator 64 which serves to electrically insulate the heat sinks 58 and 60 from each other.

The insulator 64 extends between the insulator end blocks 65 and 67 which are positioned between the ends of insulators 48 and 50. The blocks 65 and 67 are secured to insulators 48 and 50 by bolts shown in FIGURE 6 and to heat sinks 58 and 60 by bolts 69. This is required since the heat sinks 58 and 60 are the direct current bus bars for the system as will be more fully described.

The heat sinks 58 and 60 are held fixed with respect to the insulators at their ends by bolts 69 and by bolts 66 shown in FIGURES 3 and 9.

The heat sink 58 carries a plurality of pn junction semiconductor diodes 70 which preferably are of the silicon type. Each diode 70 has a stud 70a which passes through an opening formed in the heat sink 58. A lock nut 74 having a spring washer section 76 is threaded on to each stud 70a to hold the diode in place. A diode lock nut retainer 78 of the type shown in FIGURE 7 is secured to the heat sink 58 by screws 80 to hold the nuts 74 in place when the studs 70a are threaded into the nuts. This retainer 78 has hexangonal openings which mate with the hexagonal heads of the nuts 74 and also has downturned sections 78a and 78b which engage the section 76 of the nuts 74. The purpose of the retainer 78 is to hold the nuts 74 in place when it is desired to change diodes. Thus with the power rectifier assembly of this invention, the hexagonal nut portion 70b of the diode can be grasped by a wrench and the diode can then be unscrewed with the nut being held in place by a retainer 78.

As an alternative arrangement, the diodes could be secured to the heat sinks by threading the diode studs into threaded openings formed in the heat sinks.

The diodes 70 are the positive diodes of the system. In other words, the cathodes of the diodes 70 are connected to the outer case or the stud of the diode whereas the anodes of these diodes are connected with the conductors 82. It is seen from the circuit diagram of FIGURE 1 that the cathodes of all of the diodes 70 are connected with the heat sink 58 so that the heat sink 58 provides a positive DC terminal or bus-bar for all of the diodes 70. In this regard, the heat sink 58 is provided with a projecting connector section 58a which can be used to supply direct current to the traction motors. The heat sink 60 has a similar projecting portion 60a to be used for supplying direct current to the traction motors.

The heat sink 60 carries a plurality of negative diodes 84 which are secured to the heat sink 60 in the same manner as the diodes 70 are secured to heat sink 58. The stud or metal case portion of the diode 84 is its anode so that the heat sink 60 forms a common connection for all of the anodes of the diodes 84. The cathode of each diode 84 is connected with a respective conductor 86.

The wiring for supplying alternating current to the diodes of the power rectifier assembly 44 will now be described. It can be seen from FIGURE 5 that the insulators 48, 64 and 50 each have openings receiving a plurality of hexagonal studs 88. The ends of the studs 88 are theraded. The left end of the stud 88 carries a nut 90 which holds a terminal 92 in place as well as one end of a fuse 94. The opposite end of the fuse 94 is supported by a screw 96 which is shown in FIGURE 4. The screws 96 are fitted to the insulators 56 and are held with respect to the insulators 56 by the nuts 98. The fuses 94 have an indicator 94a for indicating when the fuse is blown. It will be appreciated from an inspection of FIGURES 3, 4 and 5 that the fuses are positioned in staggered groups to provide connections to the phase windings of the generator at various points.

One end of the stud 88 is fitted with a retainer 100 having a hexagonal opening complementary to the outer hexagonal shape of stud 88. A terminal 102 is held between the retainer and the nut 104 and this terminal is connected with the conductor 82 which goes to the anode of one of the diodes 70. The retainer 100 locates and fixes the position of conductor stud 88.

The phase conductors from the various phase windings of the stator are connected respectively with the studs 96 so that alternating current is supplied to the diodes through the fuses 94. After current passes through the fuses 94, it is supplied to the negative diodes 84 by conductors 86 and is supplied to the positive diodes 70 through the studs 88 and through the conductors 82. The direct current power is taken from the bus bars 58 and 60 as has been pointed out hereinbefore.

The rectifier stack 46 is similar to the rectifier stack 48 with the exception that the fused ends of the stack are inverted from their positions in the rectifier bank 44. The rectifier bank 46 is constructed in the same manner as the rectifier bank 44 and for this reason, a description will only be given of the main component parts of the rectifier bank 46.

The rectifier bank 46 has three insulators 110, 112 and 114. This rectifier bank has two heat sinks 116 and 118 which respectively support the diodes 120 and 122. The diodes 120 have their cathodes connected with the heat sink 116 so that the heat sink 116 forms the positive bus bar for the system. The anodes of the diodes 122 are connected with the heat sink 118 so that the heat sink 118 forms the negative DC output terminal. The fuse elements for the rectifier bank 46 are designated by reference numeral 124 and are shown on the schematic diagram of FIGURE 1.

The studs for the rectifier bank 46 are designated by reference numeral 126 and perform the same function as the studs 88 for rectifier bank 44. The rectifier bank 46 in other respects is identical with rectifier bank 44 with the exception that the parts are positioned as shown in FIGURE 3.

In the arrangement illustrated in FIGURE 1, the neutrals of the phase windings are connected together by conductors 130 and 132. In the system of FIGURE 1, each phase winding is connected with two diodes through a fuse as is illustrated.

It is possible to provide a rectifying system that is of the type shown in copending application S.N. 408,980, filed on Nov. 4, 1964, in the name of Elmer E. Thiessen where the rectifier side of individual phase windings are connected by the use of bus-bars 134 shown in FIGURES 4, 5 and 6. These bus bars are optional and are not used when it is desired to provide the system shown in FIGURE 1 but are used when it is desired to provide a system of the type shown in the above mentioned copending application. The six bus-bars 134 that are required, each connect one side of five phase windings and when they are used, they are disposed between the nuts 98 and one end of the fuses 94 as shown in FIGURE 4.

When the power system of this invention is used on a locomotive, the rotor 32 is driven by the diesel engine or other power source on the locomotive. When the field 12 of the rotor 32 is supplied with direct current, alternating current is induced in the stator winding 35 which is rectified to direct current by the rectifier banks 44 and 46. These rectifier banks supply direct current to the traction motors 24, 26, 28 and 30 in a manner illustrated in FIGURE 1. It is also possible to supply the traction motors from a circuit where the bus bars 58 and 116 would be connected to form one side of the source of direct current and the bus bars 60 and 118 would be connected to form the other side of the power supply for the traction motors.

The diodes located in the compartment 42 are cooled by forced air circulation. Thus, a blower which is not illustrated is provided which exhausts into the rectifier compartment 42. The end frame 36 has some openings (not shown) located behind the rectifier banks 44 and 46 which permit air to flow from the rectifier compartment 42 into the area between the rotor 32 and the stator 34. The exhaust air from the rectifier compartment therefore also serves to cool the stator winding 35 and the field winding 12 of the rotor. This blower is not illustrated but it can be of the same type that is presently used on locomotives to cool the main power generator of the locomotive which is of a direct current commutator type.

While the embodiments of the present invention as herein disclosed constitute a preferred form, it is to be understood that other forms might be adopted.

What is claimed is as follows:

1. In combination, a dynamoelectric machine having an end frame, first and second insulator plates secured to said end frame and extending axially therefrom, first and second metal heat sinks disposed between said insulator plates and supported by said insulator plates, a third insulator plate located between said metal heat sinks for insulating said metal heat sinks from each other, a plurality of diodes supported by each metal heat sink of opposite conductivity type, and an electrical conductor connected with a phase lead of said dynamoelectric machine connected with a pair of diodes of opposite conductivity type.

2. In combination, a dynamoelectric machine having an end frame, first and second insulator plates secured to said end frame and extending axially therefrom, first and second metal heat sinks located between said insulator plates, a third insulator plate located between said metal heat sinks for insulating said metal heat sinks from each other, a plurality of diodes supported by said first metal heat sink and located between said first metal heat sink and said first insulator member, a plurality of diodes of an opposite conductivity type supported by said second metal heat sink member and located between second metal heat sink and said second insulator member, a plurality of first studs forming AC input terminals supported by said first insulator member, a plurality of second studs supported by said insulator member and connected with pair of diodes of opposite conductivity type, and a fuse connected between each of said first and second studs.

3. A power supply unit for supplying current to the traction motors of a locomotive comprising, an alternating current generator including a stator winding, an end frame for said generator, first, second, third and fourth metal heat sinks supported by said end frame, a first group of diodes of a first conductivity type supported by said first metal heat sink, a second group of diodes of an opposite conductivity type supported by said second metal heat sink, a third group of diodes of the same conductivity type as said first group of diodes supported by said third metal heat sink, a fourth group of diodes of the same conductivity type as said second group of diodes supported by said fourth metal heat sink, all of said metal heat sinks forming a common support for the respective groups of diodes and each metal heat sink forming a common bus bar for a respective group of diodes, and means connecting said diodes with said stator winding, said bus bars being adapted to be electrically connected with the traction motors of a locomotive.

4. A power supply unit for supplying current to the traction motors of a locomotive comprising, a rotor member including a field winding, a stator member having a stator winding, an end frame for said generator having bearing means for supporting said rotor during its rotation, means secured to said end frame forming a rectifier compartment, first and second rectifier banks disposed in said rectifier compartment, each of said rectifier banks including a pair of heat sinks, said pairs of heat sinks each forming a common support means for groups of diodes of opposite polarity type and forming direct current bus bars for supplying current to traction motors, and means electrically connecting diodes of opposite polarity type from each group of diodes with said stator winding.

5. A power supply unit for supplying direct current to the traction motors of a locomotive comprising, a rotor member including a field winding, a stator having a stator winding, said stator winding being comprised of a plurality of three phase Y-connected windings, an end frame for said generator having bearing means for supporting said rotor during its rotation, means secured to said end frame forming a rectifier compartment, first and second metal heat sinks located within said rectifier compartment and supported from said end frame, a first group of diodes of a first polarity supported by said first metal heat sink, a second group of diodes of an opposite polarity supported by said second metal heat sink, and means electrically connecting said groups of diodes with said stator winding in such a manner that the diodes form a plurality of three phase full-wave bridge rectifier networks connected respectively with each of said plurality of three phase Y-connected output windings.

6. A power supply unit for supplying direct current to the traction motors of a locomotive comprising, an alternating current generator including a stator winding, said stator winding being comprised of a plurality of three phase Y-connected windings, an end frame for said generator, first, second, third and fourth metal heat sinks supported by said end frame, a first group of diodes of a first polarity supported by said first metal heat sink, a second group of diodes of an opposite polarity supported by said second metal heat sink, a third group of diodes of the same polarity as said first group of diodes supported by said third metal heat sink, a fourth group of diodes of the same polarity as said second group of diodes supported by said fourth metal heat sink, all of said metal heat sinks forming a common support for the respective groups of diodes and each metal heat sink forming a common bus-bar for a respective group of diodes, means electrically connecting said plurality of three phase Y-connected windings with said diodes in such a manner that each three phase Y-connected winding is connected with a three phase full-wave bridge rectifier, said bus-bars being adapted to be electrically connected with the traction motors of a locomotive.

7. A power supply unit for supplying direct current to the traction motors of a locomotive comprising, an alternating current generator including a stator winding, said stator winding being comprised of a plurality of three phase Y-connected windings, an end frame for said generator, first, second, third and fourth metal heat sinks supported by said end frame, a first group of diodes of a first polarity supported by said first metal heat sink, a second group of diodes of an opposite polarity supported by said second metal heat sink, a third group of diodes of the same polarity as said first group of diodes supported by said third metal heat sink, a fourth group of diodes of the same polarity as said second group of diodes supported by said fourth metal heat sink, all of said metal heat sinks forming a common support for the respective group of diodes and each metal heat sink forming a common bus-bar for a respective group of diodes, means electrically connecting a first group of three phase Y-connected windings with the diodes of said first and second metal heat sinks in such a manner that each three phase Y-connected winding is connected with a three phase full-wave bridge rectifier, means connecting the other there phase Y-connected windings with the diodes of the third and fourth metal heat sinks in such a manner that each of the other three phase Y-connected windings are connected with a three phase full-wave bridge rectifier.

8. A power rectifier assembly comprising, a metal heat sink having a plurality of spaced openings, a plurality of semiconductor rectifiers each having a threaded stud, said threaded studs being located respectively in said openings in said heat sink, each threaded stud being insertable into an opening from a first side of said heat sink and capable of being withdrawn from said opening from said first side of said heat sink, a nut engaging each threaded stud and engaging a second side of said heat sink, opposite from said first side of said heat sink and a retaining means secured to said heat sink for preventig axial and rotative movement of said nuts, said retaining means having portions engaging said nuts for preventing axial and rotative movement of said nuts.

9. The power rectifier assembly according to claim 8 where the retaining means has a plurality of openings complementary in shape to said nuts, the edges of said openings engaging the sides of said nuts to prevent rotation of said nuts, said retaining means having downturned sections forming at least a part of said openings in said retaining means and engaging said nuts to prevent axial movement of said nuts.

References Cited
UNITED STATES PATENTS

| | | | |
|---|---|---|---|
| 2,999,971 | 9/1961 | Schnecke | 310—100 |
| 3,194,994 | 7/1965 | Latta | 310—68 |
| 3,271,601 | 9/1966 | Raver | 310—68 |

MILTON O. HIRSHFIELD, *Primary Examiner.*

J. D. MILLER, *Assistant Examiner.*